(12) United States Patent
Hamilton (10) Patent No.: US 7,171,045 B1
(45) Date of Patent: Jan. 30, 2007

(54) SYSTEM AND METHOD FOR DETERMINING A NATURAL COLOR DEPTH OF A DIGITAL IMAGE

(75) Inventor: Chris H. Hamilton, Kelowna (CA)

(73) Assignee: Packeteer, Inc., Cupertino, CA (US)

( * ) Notice: Subject to any disclaimer, the term of this patent is extended or adjusted under 35 U.S.C. 154(b) by 845 days.

(21) Appl. No.: 10/033,465

(22) Filed: Dec. 28, 2001

(51) Int. Cl.
*G06K 9/00* (2006.01)

(52) U.S. Cl. ................ 382/166; 382/232; 355/426.14; 375/240.03

(58) Field of Classification Search ............... 382/166, 382/167, 245, 246, 251–252, 232, 299, 162, 382/247; 358/1.15, 524, 426.01, 426.14, 358/518, 520, 523; 345/600–601, 630, 593, 345/590; 375/240.19, 240.03, 240.23
See application file for complete search history.

(56) References Cited

U.S. PATENT DOCUMENTS

| | | | | |
|---|---|---|---|---|
| 5,119,186 A | * | 6/1992 | Deacon et al. ............. | 358/524 |
| 5,459,486 A | * | 10/1995 | Iverson et al. ............. | 345/593 |
| 6,532,020 B1 | * | 3/2003 | Friedman et al. .......... | 345/601 |
| 6,578,073 B1 | * | 6/2003 | Starnes et al. ............. | 709/219 |
| 2002/0054335 A1 | * | 5/2002 | Sekiguchi .................. | 358/1.15 |

OTHER PUBLICATIONS

Gonzalez A.I., et al., "A comparison of experimental results with an Evolution Strategy and Competitive Neural Networks for near real-time Color Quantization of image sequences," 1998, 21 pps, Univ. Pais Vasco, San Sebastián, Spain.

* cited by examiner

*Primary Examiner*—Kanjibhai Patel
*Assistant Examiner*—Ali Bayat
(74) *Attorney, Agent, or Firm*—Patrick J. S. Inouye (57) ABSTRACT

A system and method for determining a natural color depth of a digital image is described. Color distances between each pair of colors in a color palette stored for a digital color image are determined. A closest neighboring color for each color in the color palette separated by a substantially minimum color distance is selected. Each color pair that is visually indistinct is merged in iterative sequence.

34 Claims, 10 Drawing Sheets
(2 of 10 Drawing Sheet(s) Filed in Color)

Figure 7 (con'd).

Figure 9.

SYSTEM AND METHOD FOR DETERMINING A NATURAL COLOR DEPTH OF A DIGITAL IMAGE

FIELD OF THE INVENTION

The present invention relates in general to image processing and, in particular, to a system and method for determining a natural color depth of a digital image.

BACKGROUND OF THE INVENTION

Continuous tone photo-realistic still and moving images can be stored in digital form as matrices of quantized analog values. Each matrix is a two-dimensional matrix of individual picture elements or "pixels," which each store a value representing a color or grayscale tone on an integer-based gradient scale. For example, a single 16-bit pixel value represents one color picked from a palette consisting of $2^{16}$ or 65,536 individual colors. The number of available colors in the color palette is known as the color depth. The pixels for each image are stored into a file rendering the image at a set dimension, such as 640×480 pixels.

In raw uncompressed form, the size of a digital image file increases dramatically with the color depth and image dimensions. A richer color palette has more color values and a larger dimensioned image stores a proportionately increased number of pixels. Fortunately, digital image storage can benefit from data compression techniques which take advantage of repetitive or otherwise structured data to compress a digital image file to a smaller size. The Joint Photographic Expert Group (JPEG) file format is presently the most commonly used format for storing compressed photo-realistic digital image file data, and is described in G. K. Wallace, "The JPEG Still Picture Compression Standard," Comm. of the ACM (April 1991), and W. B. Pennebaker et al., "JPEG Still Image Data Compression Standard," Van Nostrad Rhinehold (1993), the disclosures of which are incorporated by reference.

Historically, hardware limitations have dictated the color depth of digital images. Early color graphics adapters supported a limited number of bits per pixel and consequently the maximum image size and color depth were device-dependent. The number of colors appearing in a digital image were thus limited and had to be reduced by mapping the colors to the palette available to the display device prior to display.

Increasingly, digital images are being exchanged between interconnected networks of computer systems, including over the Internet, as well as with lightweight clients, such as personal data assistants (PDAs) and cellular telephones. Typically, these devices offer display devices capable of providing a range of colors that push the very limits of visual perception.

The rich color depths afforded by these devices result in large file sizes. However, the ability to exchange data, including digital images, over a network, is limited in part by the network bandwidth available to each device. In turn, the available bandwidth is affected by the capabilities of and load upon the network infrastructure, as well as by the means by which each client is interconnected. Low bandwidth dictates longer download times for larger file sizes. A slow modem connection, for instance, has low bandwidth that restricts the ability of a client to download data. Low bandwidth is particularly problematic when receiving digital images as content embedded, for instance, in Web pages. A balance between color depth and file size is necessary to accommodate the bandwidth available to a requesting client.

One solution to resolving the low bandwidth problem is to apply color reduction to a digital image file. Decreasing the color density by using a smaller color palette decreases the file size. In basic color reduction, the color palette is reduced by combining closely-related colors. Colors in the original palette are mapped to a smaller color table as a form of "lossy" data compression, that is, a process that loses information upon compression. A certain degree of image-dependent color reduction can be applied without affecting visual perception. The minimal number of colors needed to represent a digital image without affecting visual perception is referred to as the natural color depth. Ideally, color reduction will reduce color depth close to the natural color depth.

In practice, natural color depth is difficult to achieve. The capabilities of the display device, lighting conditions, observer's eyesight and a myriad of similar factors affect the natural color depth of an image, such as described in R. C. Gonzalez et al., "Digital Image Processing," pp. 21–28 (Addison-Wesley Pub. Co. 1992), the disclosure of which is incorporated by reference.

Two prior art approaches apply color reduction to digital images in an effort to reduce a digital image to a target number of colors while attempting to minimize perceptual error. The first prior art approach is performed manually by graphics artists who perform an ad hoc selection of individual colors on an image-by-image basis. The goal is to optimize the compression ratio of the image balanced against visual fidelity. Nevertheless, this approach results in inconsistent results and typically uses an unnecessarily large number of colors.

In the second prior art approach, conventional color reduction approaches attempt to map the colors used in an image to a target palette of colors at a predetermined color depth. Proximate colors are mapped based on intensity without considering visual area. This approach can cause undesirable visual artifacts and uses an unnecessarily large number of colors in maintaining an acceptable visual quality. As well, by basing color reduction on a predetermined color depth, conventional color reduction approaches fail to find a substantially minimum number of colors necessary to achieve the natural color depth.

Therefore, there is a need to an approach to reducing the number of colors in a digital image to a natural color depth. Such an approach would preferably result in the selection of a substantially minimum number of colors to thereby maximize the visual perception of the resulting color reduced image. Preferably, such an approach would work either alone or with other forms of color reduction.

There is a further need for an approach to performing automatic color reduction of digital images. Such an approach would preferably dynamically analyze the colors used in an image and substantially minimize the colors to render the image in a natural color depth.

SUMMARY OF THE INVENTION

The present invention provides a system and method for reducing the number of colors used in a digital image to a natural color depth.

An embodiment of the present invention provides a system and method for determining a natural color depth of a digital image. Color distances between each pair of colors in a color palette stored for a digital color image are determined. A closest neighboring color for each color in the color palette separated by a substantially minimum color distance is selected. Each color pair that is visually indistinct is merged in iterative sequence.

A further embodiment provides a system and method for reducing a color palette of a digital image to a natural color depth. A neighboring color closest in color distance in a color space for each unique color in the color palette of a digital image is selected. The unique color and the closest neighboring color are merged. Visual distinctness of the unique color is determined based on the visual area occupied by the unique color in the digital image. The unique color and the closest neighboring color are combined when visually indistinct. The color palette is reduced by replacing all occurrences of the unique color and the closest neighboring color with the combined color.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

The file of this patent contains at least one drawing executed in color. Copies of this patent with color drawings will be provided by the Patent and Trademark upon request and payment of the necessary fee.

DETAILED DESCRIPTION

Figure 1:
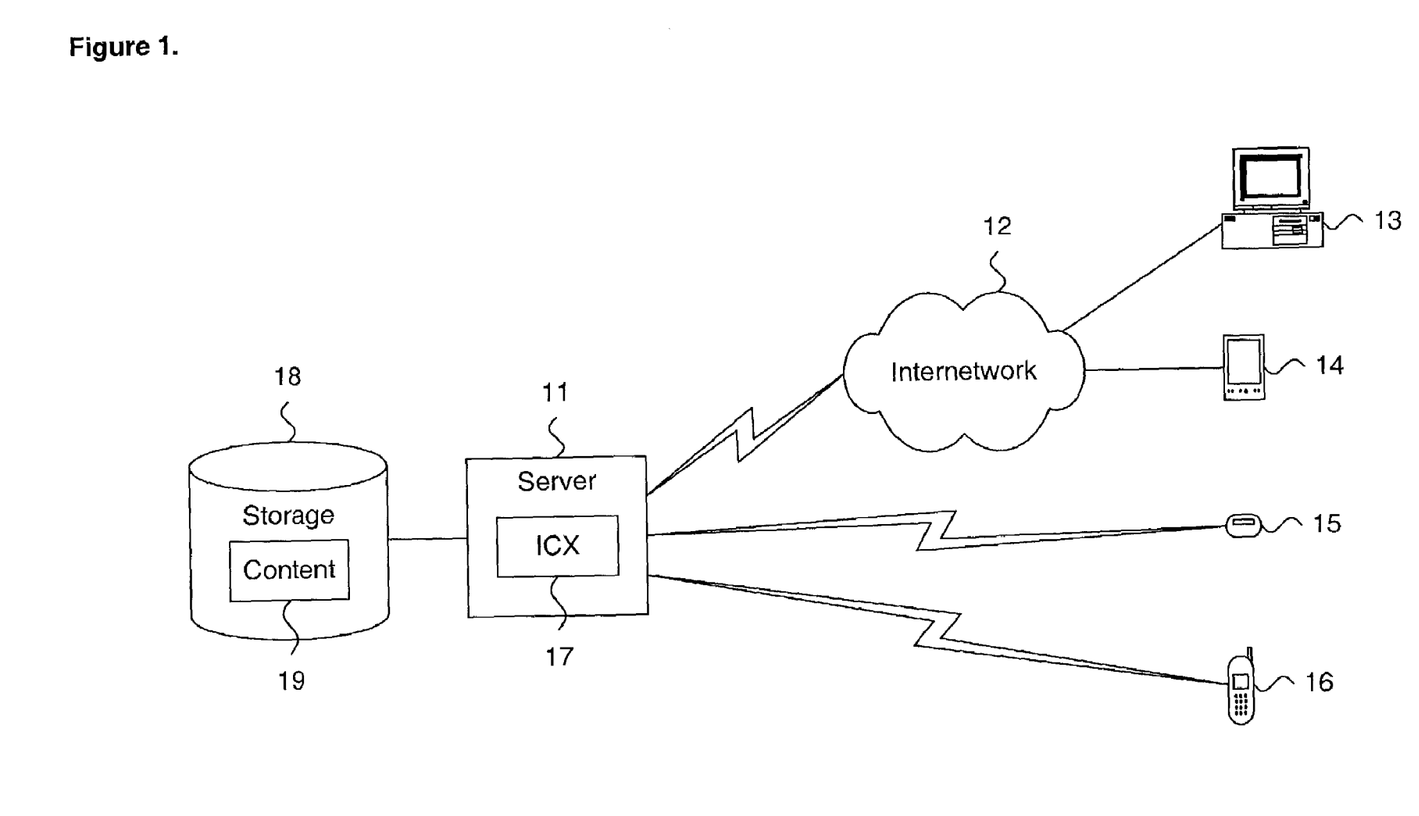
FIG. 1 is a functional block diagram showing a distributed computing environment, including a system for determining a natural color depth of a digital image, in accordance with the present invention.

FIG. 1 is a functional block diagram 10 showing a distributed computing environment, including a system for determining a natural color depth of a digital image, in accordance with the present invention. By way of example, a server 11 serves content 19 maintained in a peripheral storage device 18 to a plurality of interconnected devices, which each include means for displaying digital images. These devices include a computer system 13 and a personal data assistant (PDA) 14, interconnected over an internetwork 12, including the Internet. These devices can also include a pager 15 or cellular telephone 16, respectively interconnected via short messaging service and telephony servers (not shown). Other types of devices, as well as network topologies and configurations, are possible, as would be recognized by one skilled in the art.

The server 11 includes an Internet content accelerator (ICX) 17 that optimizes and accelerates the serving of the content 19 to the various devices 13–16. The capabilities to receive content 19 depend greatly upon the type of device bandwidth available to the interconnection. PDAs 14, pagers 15, and cellular telephones 16 typically have limited storage and display capabilities. These types of devices may not be capable of receiving larger digital images for storage and display. Similarly, low-bandwidth connections might be prohibitively slow and impractical for serving the larger digital images.

To address the issue of delivering the content 19, and in particular, digital images, to limited-capability clients and over low-bandwidth connections, the Internet content accelerator 17 analyzes the data and optimizes and accelerates the transmission to the various devices 13–16. In the described embodiment, an Internet content accelerator 17 suitable for use in the present invention is the Appcelera product running the PacketWise software suite, sold and licensed by Packeteer Inc., Cupertino, Calif.

One approach to addressing the low bandwidth problem is to reduce the number of colors used in digital images to a natural color depth, as further described below with reference to FIG. 3. Color reduction decreases the size of the image files sent to requesting clients 13–16 by removing visually indistinct colors from the image color palette. Paletted digital image file formats include GIF and PNG file formats. Other image file formats and variations, such as animated GIF file formats, could also be used, as would be recognized by one skilled in the art.

The individual computer systems, including servers and clients, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs and data, are loaded into the RAM for execution and processing by the CPU and results are generated for display, output, transmittal, or storage.

Figure 2A:
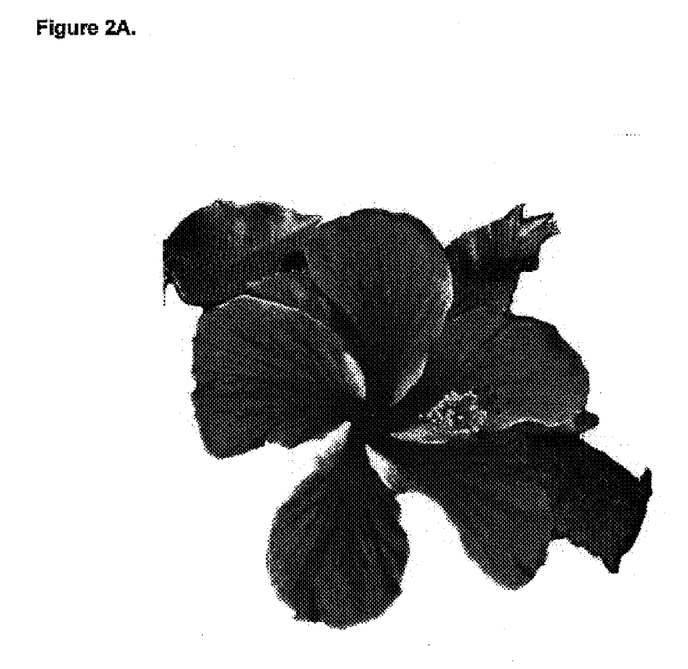
FIGS. 2A–B show, by way of example, digital images rendered at normal and natural color depths, respectively.
Figure 2B:
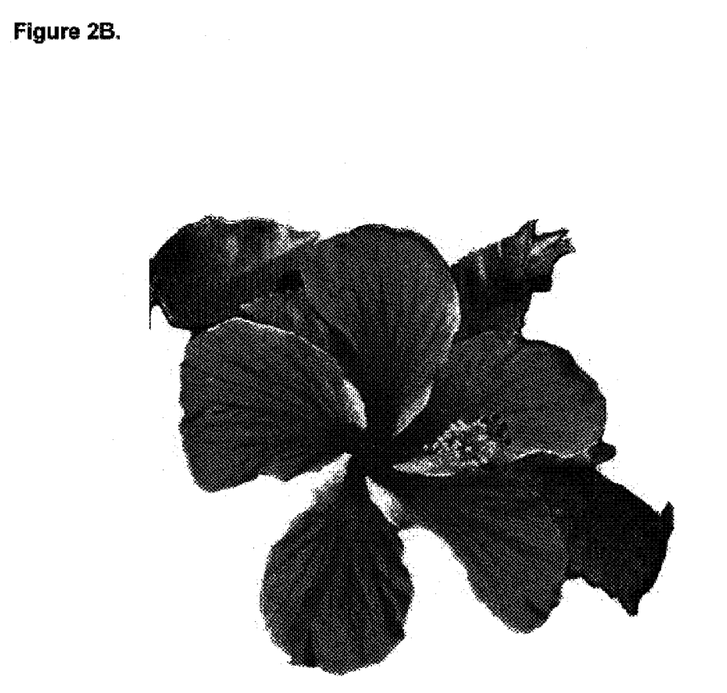

FIGS. 2A–B show, by way of example, digital images rendered at normal and natural color depths, respectively. Referring first to FIG. 2A, the original image is a 256-color image, which contains numerous visually indistinct yet subtle color pairings. Referring next to FIG. 2B, the natural color depth of the original image has been determined by the system of FIG. 1 and the color palette accordingly reduced to 65 colors. Slight visual differences are present when comparing the two images directly, yet the reduction to natural color depth preserves the visual perception of the resulting color reduced image. In addition, the reduced color palette significantly reduces the size of the file. Empirically, the original image had a file size of 56,224 bytes before color reduction, and 32,355 bytes after, thereby resulting in a compression savings of 42.5%.

Figure 3:
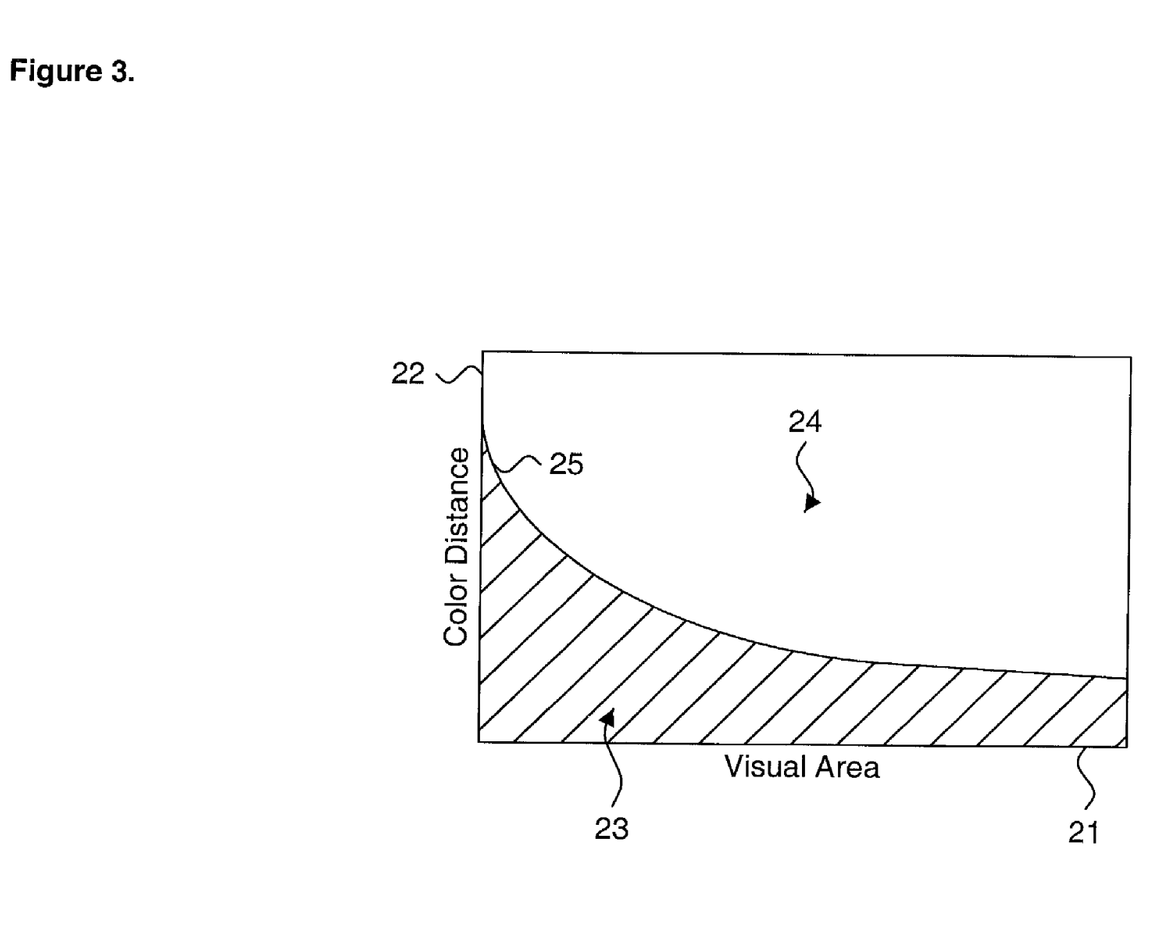
FIG. 3 is a graph showing, by way of example, a curve of visual distinction generated by the system of FIG. 1.

FIG. 3 is a graph 20 showing, by way of example, a curve of visual distinction 25 generated by the system 17 of FIG. 1. Briefly, during color reduction to a natural color depth, each color in the current color palette is selected and the nearest neighbor found. Visually indistinct color pairs are merged. Visual distinctiveness between any given pair of colors x and y is dependent on the visual area occupied by color x and the distance of each remaining color y from color x.

The visual distinctiveness for a given color x can be calculated as a function $f(x)$ of the visual area occupied by the color x. By way of illustration, a visual distinctiveness curve 25 can be generated by mapping the output of the function $f(x)$ with the visual area occupied by color x 21 along the x-axis and color distances from color x 22 mapped along the y-axis. The function $f(x)$ returns a value representing the maximum distance any color may be from color x before color y is considered visually distinct. The visual distinction curve 25 represents a negative-power curve that provides a threshold between differences in two colors below which the two colors are virtually indistinguishable. The set of all merged colors for a given image represents the substantially minimized number of unique colors necessary to render the image using a natural color depth.

Each point along the visual distinction curve 25 can be determined as a continuous function of the visual area occupied by a given color, in accordance with equation (1), as follows:

$$f(x) = \frac{c}{x + c(y_2 - y_1)^{-1}} + y_1 \quad (1)$$

where x represents the visual area occupied by a given color, $y_1$ denotes a horizontal asymptote, $Y_2$ denotes a y-intercept, and c denotes a fitted curve constant. In the described embodiment, the curve-fitted values are $y_1$ equals 5.5, $Y_2$ equals 33, and c equals 150.

The visual distinction curve 25 presents inherent assumptions about display and light characteristics, which can be modified through equation (1), as necessary. Each color x proximately located to another color y falling within a distance within the area of visual indistinguishability 23 can be merged with other colors with no loss in visual perception, thereby effecting a reduction in the number of colors necessary to render the image. The merged image can then be further optimized for transmission over low-bandwidth connections.

Figure 4:
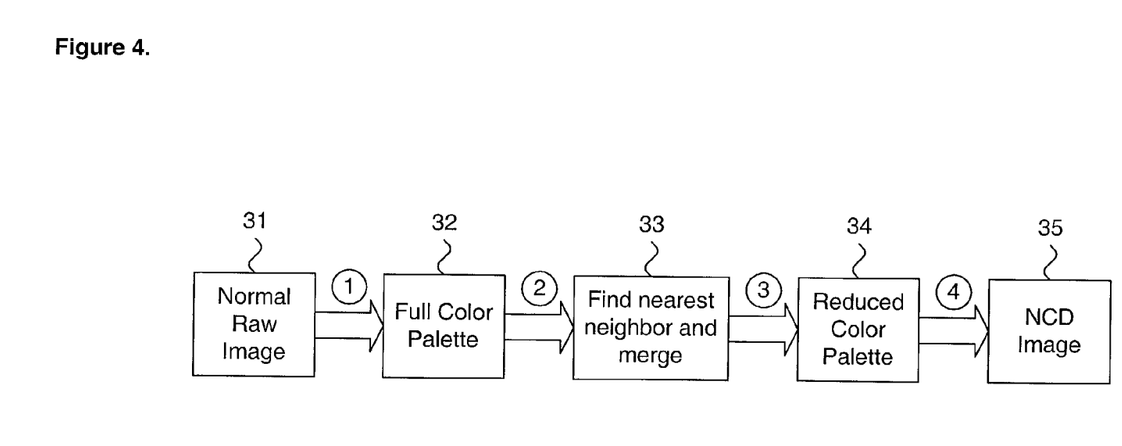
FIG. 4 is a process flow diagram showing the operations performed to determine a natural color depth.

FIG. 4 is a process flow diagram showing the operations 30 performed to determine a natural color depth. A raw digital image 31 comprising a two-dimensional matrix of pixel values indicating color values and spatial positions is stored on a storage device 18 (shown in FIG. 1). Alternatively, the raw image 31 could be a grayscale image with each pixel value representing a tonal value of gray for rendering a black and white image. For purposes of illustration, operations performed on color images are described herein, although one skilled in the art would recognize that a grayscale image could likewise be processed as a color image having a single component.

A full color palette 32 for the raw digital image 31 is retrieved (step ①). The full color palette 32 represents the complete set of unique colors available at the current color depth of the raw image 31. For instance, an eight-bit color depth would require a full color palette of $2^8$ or 256 colors. Larger color palettes can be reduced to a natural color depth, but require proportionately more memory and processing time. In the described embodiment, images having color palettes in excess of 256 colors are first color-reduced down to an eight-bit color depth using standard color reduction techniques to create a 256 color palette. The color palette is then reduced to a natural color depth.

Next, all of the colors in the full color palette 32 are iteratively processed to locate the closest neighboring color pairs and to merge visually indistinct colors (step ②) into a reduced color palette 34, as further described below with reference to FIG. 7. The closest neighboring color is nearest in color distance. In the described embodiment, the color distances are simple Euclidean distances and the color space is CIELAB to enable color distances to resemble the visual differences as seen by the human eye as closely as possible. Other color spaces could also be used, including RGB, sRGB, YUV, HSV, HSB, YCbCr, and so forth, as would be recognized by one skilled in the art. Finally, the raw image 31 is rendered (step ④) to generate the image at a natural color depth 35.

Figure 5:
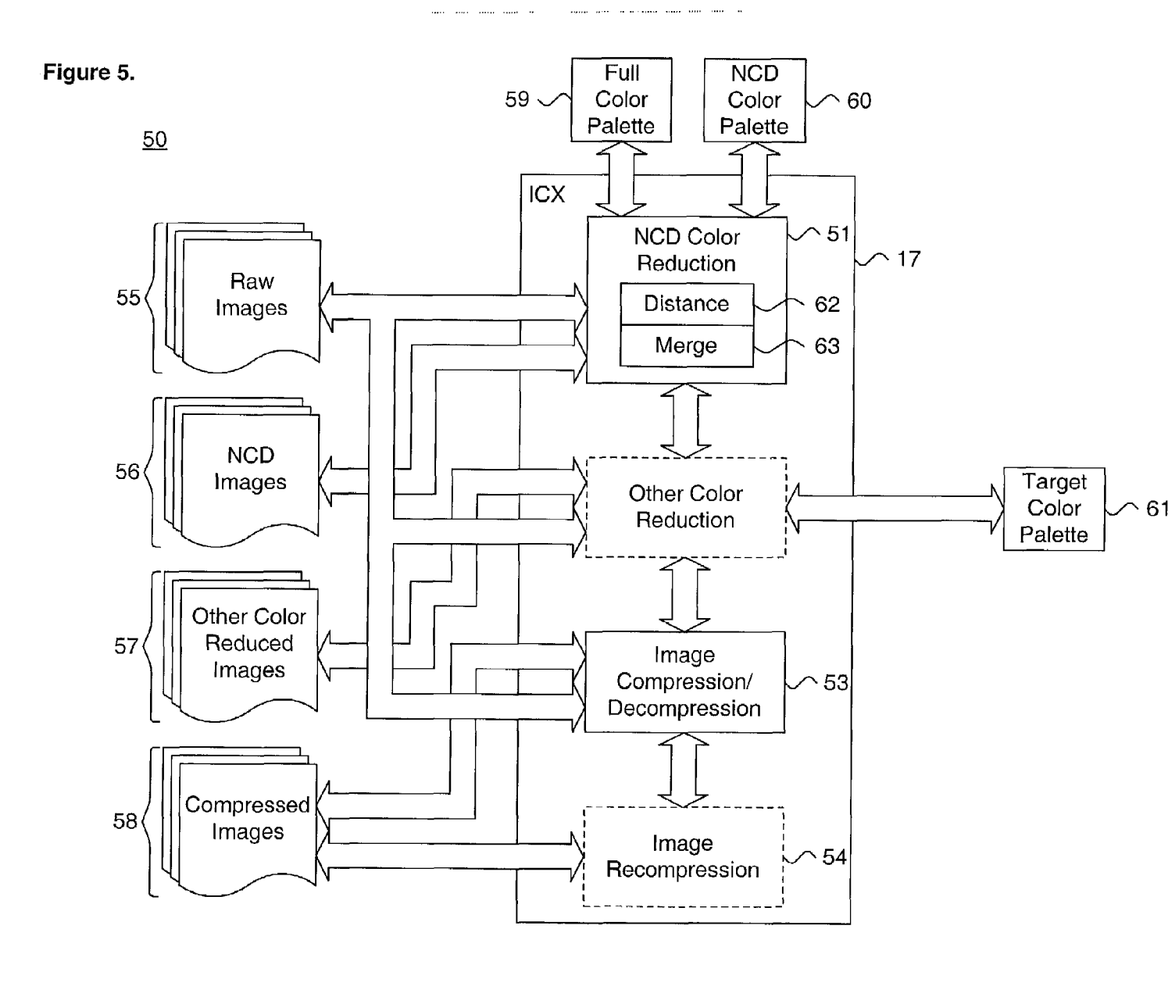
FIG. 5 is a block diagram showing the system for determining a natural color depth of a digital image of FIG. 1.

FIG. 5 is a block diagram showing the system 50 for determining a natural color depth of a digital image of FIG. 1. The system 50, through the Internet Content Accelerator (ICX) 17, performs color reduction on raw digital images or, alternatively, on already-color reduced digital images, to determine a natural color depth. The natural color depth can then be used to compress a raw image file into a new (and more space-efficient) image file.

The Internet Content Accelerator 17 includes four modules, including two optional module: natural color depth (NCD) color reduction 51, other color reduction 52 (optional), image compression/decompression 53, and image recompression 54 (optional). One skilled in the art would recognize that the Internet Content Accelerator 17 includes further modules for selecting content 19 (shown in FIG. 1) and determining an appropriate optimization and acceleration strategy. These modules have been omitted for clarity and brevity of discussion herein.

The natural color reduction module 51 performs color reduction to a natural color depth. Raw images 55 are retrieved and color reduced into natural color depth images 56. The natural color reduction module 51 obtains the full color palette for each normal raw image 55. The closest neighboring color of each unique color is determined by a color distance module 62. If the closest neighboring colors are visually indistinct, the colors are merged by a color merge module 63 to generate a natural color depth color palette 60.

The other color reduction modules 52 perform conventional mapping of the colors in the full color palette 59 for each of the normal raw images 55 to reduce the number of colors used to a target color palette 61, as is known in the art. The other color reduction module 52 attempts to perform color reduction while minimizing errors to generate other color reduced images 57. The other color reduction module 52 is optional and can work either in conjunction with or separate from the natural color reduction module 51. When working in conjunction with the natural color reduction module 51, the other color reduction modules 52 can either generate a color reduced digital image as an input to the natural color reduction module 51 or receive the output of the natural color reduction module 51, that is, the number of colors determined to be the natural color depth. In the described embodiment, the other color reduction modules 52 preprocesses digital images having a color palette in excess of 256 colors to generate input color images to the natural color reduction module 51 at an eight-bit color depth.

The image compression/decompression module 53 performs standard image compression and decompression, as is known in the art. Raw images 55 are retrieved and compressed into compressed images 58 and vice versa, as required. Similarly, the optional image recompression module 54 recompresses compressed images 58 to further reduce file sizes, such as described in commonly-assigned related U.S. patent application Ser. No. 10/012,138, entitled "System And Method For Recompressing A JPEG Image Using Requantization," filed Nov. 9, 2001, pending, the disclosure of which is incorporated by reference.

Each module in the accelerator 17 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The accelerator 17 operates in accordance with a sequence of process steps, as further described below with reference to FIG. 6.

Figure 6:
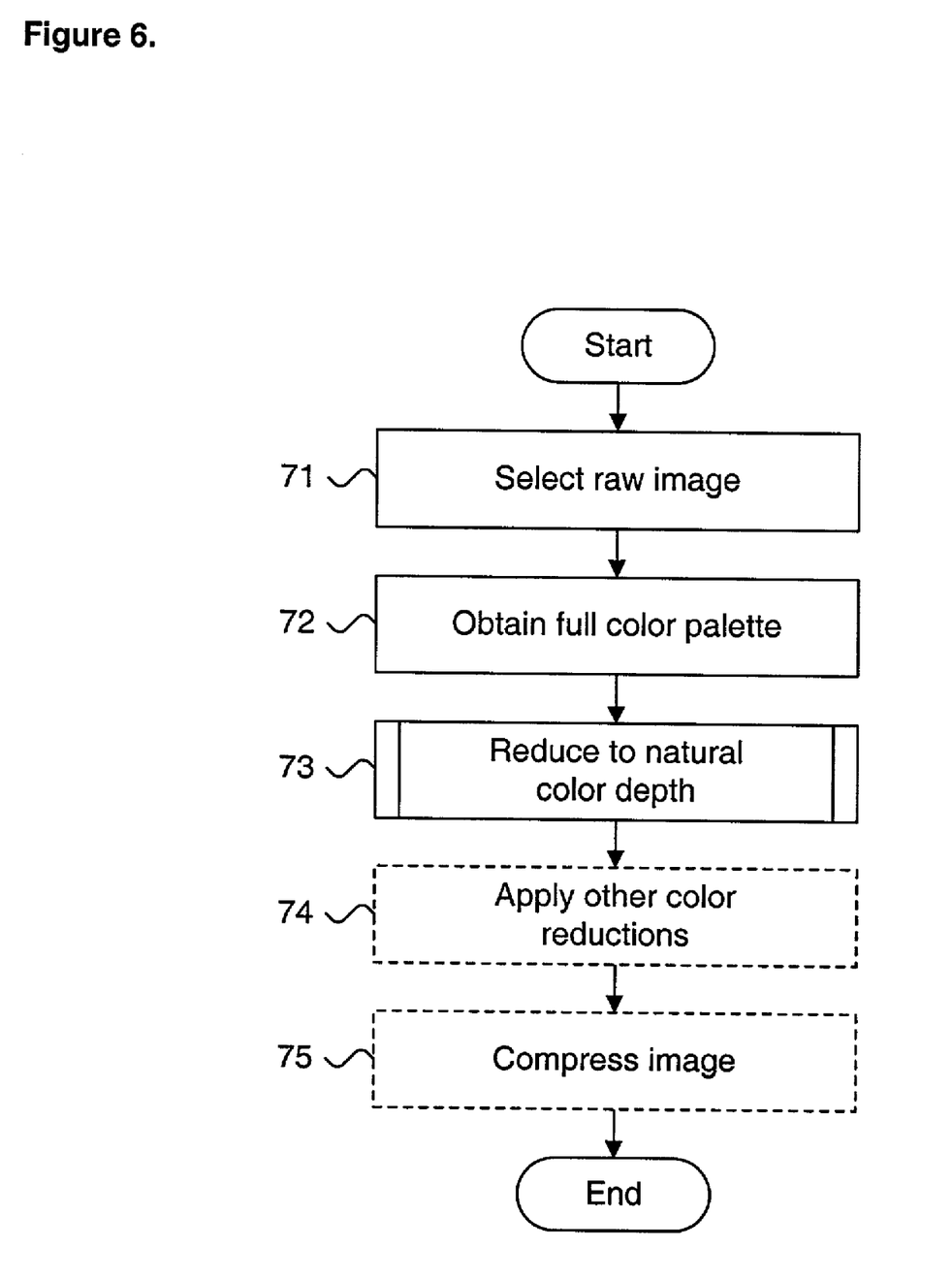
FIG. 6 is a flow diagram showing a method for determining a natural color depth of a digital image, in accordance with the present invention.

FIG. 6 is a flow diagram showing a method 70 for determining a natural color depth of a digital image, in accordance with the present invention. Briefly, the purpose of this method is to reduce the color depth in a full color palette 59 (shown in FIG. 5) to a substantially minimum number of unique colors required to render the image at a natural color depth. The reduced color depth is stored in a natural color depth color palette 60.

Thus, a raw image 55 (shown in FIG. 5) (block 71) is selected and the full color palette 32 for the raw image 55 is obtained (blocks 72). The raw image 55 is reduced to a natural color depth (block 73), as further described below with reference to FIG. 7. Finally, the remaining two operations are optional. Other color reductions can be applied (block 74) and the color reduced image can be compressed (block 75), as desired. The method then terminates.

Figure 7:
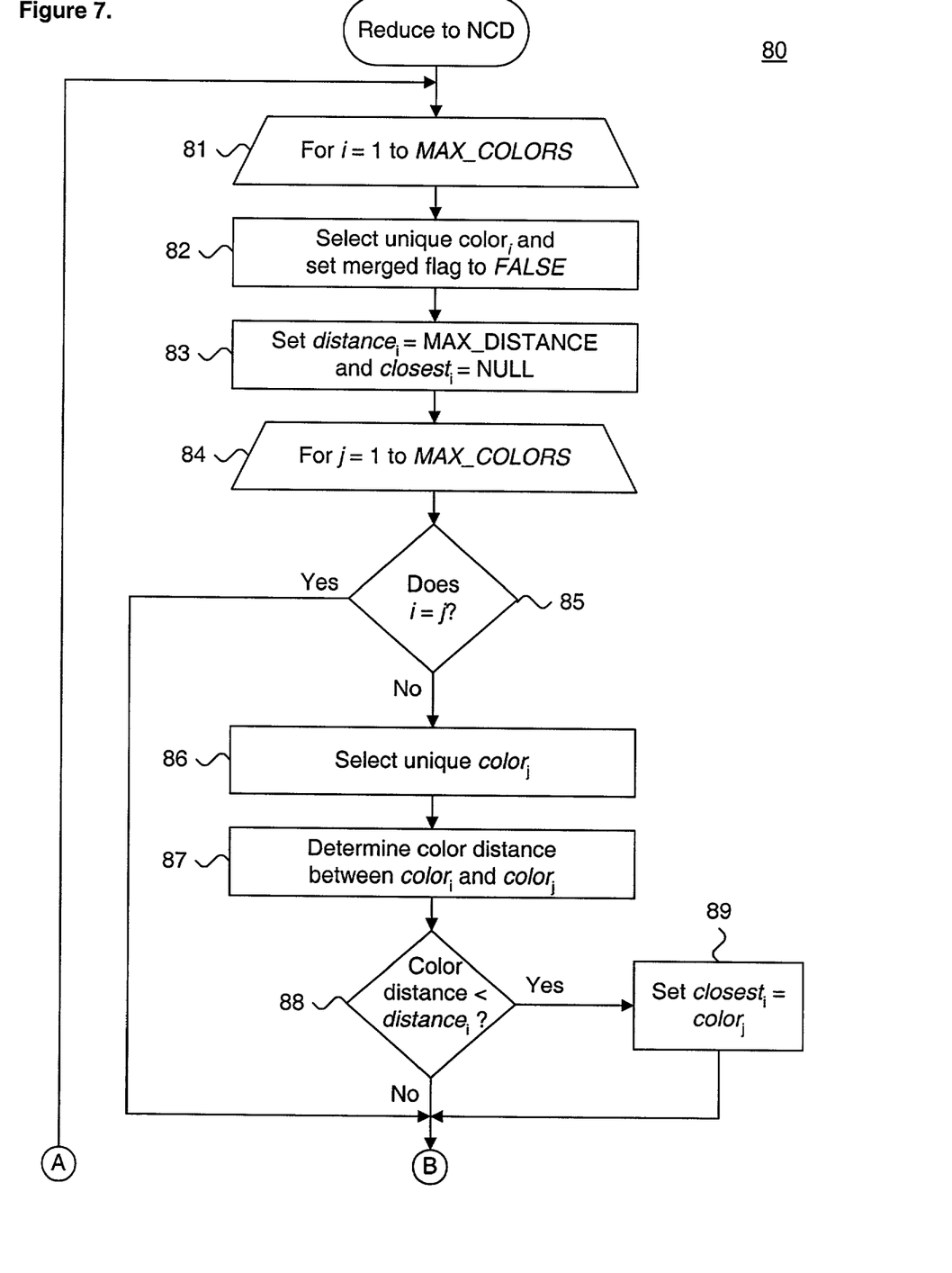
FIG. 7 is a flow diagram showing the routine for reducing a digital image to a natural color depth for use in the method of FIG. 6.

FIG. 7 is a flow diagram showing the routine 80 for reducing a digital image to a natural color depth for use in the method of FIG. 6. The purpose of this routine is to iteratively determine the closest neighboring color for each unique color and to merge visually indistinct colors. Color reduction is performed as an iterative process repeated until no further colors are merged. During each iteration, the nearest neighbor to each unique color in the full color palette is identified, as determined by color-distance. Visual distinctiveness is evaluated as a function of visual area and color distance and visually indistinct color pairs are merged. Visually distinct color pairs are maintained in the color palette.

The method 70 can be expressed procedurally using pseudocode, as follows. Let C denote the set of all colors in an image to be reduced, and let each color be represented as a vector in $\Re 3$. Each unique color x in the image can be iteratively processed against other colors y, as follows:

```
for ∀x ∈ C
{
    find y such that |x-y| = min{|x-x|, ∀z≠x ∈ C}
    if !visually_distinct(x,y)
        merge (x,y)
}
```

In the described embodiment, the foregoing iterative processing loop is repeatedly performed until no colors merge, after which the processing is complete.

Visual distinction (visually_distinct(x,y)) is dependent, in part, on the number of occurrences of color x in the image. Accordingly, let count (x) denote the number of occurrences of color x in the image. In the described embodiment, merging colors (merge (x,y)) involves taking a weighted average of the color pair x and y, as follows:

```
merge (x,y)
{
    z = (count(x)*x+count(y)*y)/
        (count(x)+count(y))
    return z
}
```

Finally, let the visual area occupied by color x (visual_area (x)) denote the size of the largest four-way connected block of pixels of color x. Visual distinction (visually_distinct (x,y)) can be determined, as follows:

```
visually_distinct(x,y)
{
    if |x-y| < f(visual_area(x))
        return false
    else
        return true
}
```

As an overview, the color palette is constantly revised. Each unique color in the color palette is repeatedly analyzed for visual distinctiveness (blocks 81–97) until no colors merge. The closest neighboring colors are located (blocks 84–90) and visually indistinct colors are merged (blocks 92–95).

Thus, all of the colors in the color palette are iteratively processed (blocks 81–96), where MAX_COLORS represents the current number of colors in the color palette. During each pass (block 81), a unique color, $color_i$, is selected and an internal merged flag is set to FALSE (block 82) to indicate that no colors have been merged during the current pass. The distance, $distance_i$, of the nearest neighboring color is set to the value of the maximum color distance, MAX_DISTANCE, as an initial value, and the closest neighboring color, $closest_i$, is set to NULL (block 83).

Each of the other remaining colors in the color palette are then iteratively processed (blocks 84–90). During each pass (block 84), the current color is skipped (block 85). A second unique color, $color_j$, is selected (block 86) from the colors remaining in the color palette. The color distance from the first unique color, $color_i$, is then determined (block 87). If the color distance between the first unique color, $color_i$, and second unique color, $color_j$, is less than the distance, $distance_i$, of the current closest neighboring color (block 88), the closest neighboring color, $closest_i$, is set to equal the second unique color, $color_j$ (block 89). Processing continues with each successive remaining unique color, $color_j$ (block 90).

After identifying the nearest neighboring color, visual distinctiveness is determined as a function $f(x)$ of the visual area of the first unique color, $color_i$ (block 91). In the described embodiment, the visual distinctiveness function $f(x)$ is calculated in accordance with equation (1), although other functions could be used, as would be recognized by one skilled in the art. The function $f(x)$ returns a value representing the maximum distance that a color may be located from the first unique color, $color_i$, before becoming visually distinct.

Figure 8:
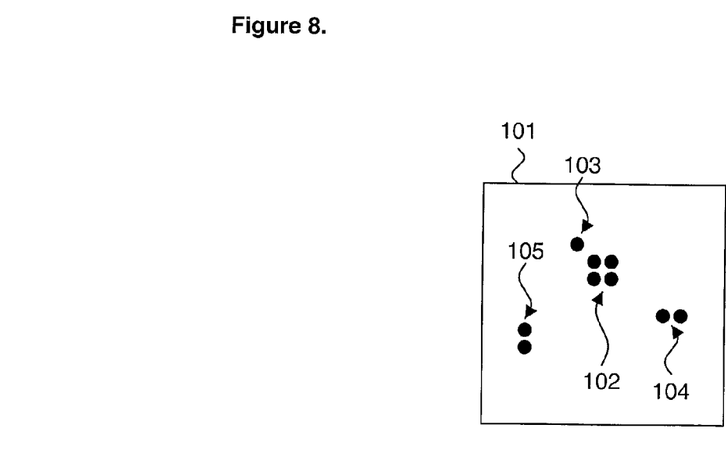
FIG. 8 is a block diagram showing, by way of example, four-way pixel connectedness in a digital image.

The visual area occupied by a given color is simply an integer value indicating the number of pixels contained in the largest four-way connected block of pixels of that color. The largest four-way connected block is the largest set of pixels that are contiguously connected to each other via horizontal or vertical neighbors. FIG. 8 is a block diagram 100 showing, by way of example, four-way pixel connectedness in a digital image 101. Two pixels are considered four-way connected when the pixels are horizontal or vertical neighbors. Thus, the 2×2 block of pixels 102 represents a contiguous four-way connected block, as is the singleton pixel 103. As well, 1×2 pixel block 104 and 2×1 pixel block 105 are also four-way connected blocks. Diagonal connectivity is too weak to constitute four-way connectedness. Accordingly, the combined pixels of pixel block 102 and singleton pixel 103 are not four-way connected.

Referring back to FIG. 7, if the distance, distances, to the closest neighboring color, closest$_i$, is less than the return value of function $f(x)$, the first unique color, color$_i$, and second unique color, color$_j$, are visually indistinct (block 92) and are merged (block 93), as further described below with reference to FIG. 9. Following merger, the color palette is reduced by one color (block 94) and the internal merged flag is set to TRUE (block 95) to indicate that at least one color pair was merged during the current pass.

If at least one color pair was merged during the current pass, that is, the internal merged flag is set to TRUE (block 97), all of the colors in the color palette are repeated iteratively processed (blocks 81–96). Otherwise, processing ends and the routine returns.

Figure 9:
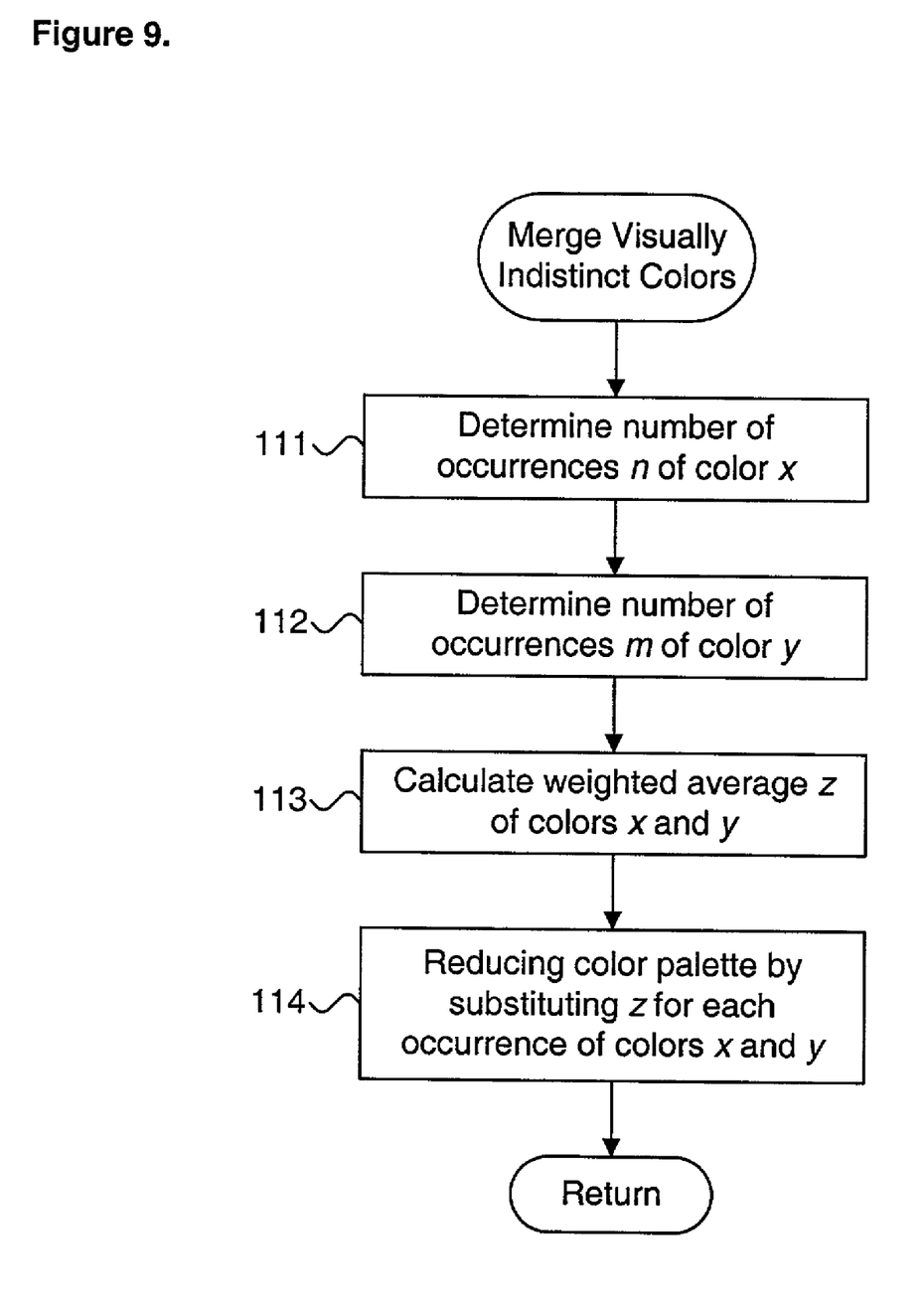
FIG. 9 is a flow diagram showing the routine for merging visually indistinct colors for use in the routine of FIG. 7.

FIG. 9 is a flow diagram showing the routine 110 for merging visually indistinct colors for use in the routine of FIG. 7. The purpose of this routine is to merge two nearest neighboring unique colors by taking a weighted average of their respective values.

Thus, the number of occurrences n of a first unique color x and the number of occurrences m of a second unique color y are determined (blocks 111 and 112, respectively). A weighted average z of the first unique color x and the second unique color y is calculated (block 113) and the color palette is reduced by one color by substituting the value of the weighted average z for each occurrence of colors x and y (block 114). The routine then returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for determining a natural color depth of a digital image, comprising:
   a color distance module determining color distances between each pair of colors in a color palette stored for a digital color image;
   a merge module selecting a closest neighboring color for each color in the color palette separated by a substantially minimum color distance, and merging, in iterative sequence, the colors in each color pair that are visually indistinct.

2. A system according to claim 1, further comprising:
   an averaging module generating a weighted average of the colors in each color pair that are visually indistinct.

3. A system according to claim 2, wherein the weighted average z is calculated, in accordance with the equation:

$$z = \frac{[\text{count}(x) \times x] + [\text{count}(y) \times y]}{\text{count}(x) + \text{count}(y)};$$

where x and y are the colors in the color pair, and count( ) denotes the number of occurrences of each color in the digital color image.

4. A system according to claim 1, wherein visual distinctness is determined based on an output of a function $f$ of visual area, in accordance with the equation:

$$f(x) = \frac{c}{x + c(y_2 - y_1)^{-1}} + y_1;$$

where x is a visual area occupied by one of the colors in the color pair, $y_1$ denotes a horizontal asymptote, $y_2$ denotes a y-intercept, and c represents a fitted curve constant.

5. A system according to claim 4, further comprising:
   a visualization module determining visual distinction Δ, in accordance with the equation:

$$\Delta(x, y) = \begin{cases} \text{TRUE,} & \text{if } |x - y| \geq f(v(x)); \\ \text{FALSE,} & \text{if } |x - y| < f(v(x)); \end{cases}$$

where v is a visual area comprising a largest four-way block of contiguous pixels of one of the colors in the color pair.

6. A method for determining a natural color depth of a digital image, comprising;
   determining color distances between each pair of colors in a color palette stored for a digital color image;
   selecting a closest neighboring color for each color in the color palette separated by a substantially minimum color distance; and
   merging, in iterative sequence, the colors in each color pair that are visually indistinct.

7. A method according to claim 6, further comprising:
   generating a weighted average of the colors in each color pair that are visually indistinct.

8. A method according to claim 7, further comprising:
   calculating the weighted average z, in accordance with the equation:

$$z = \frac{[\text{count}(x) \times x] + [\text{count}(y) \times y]}{\text{count}(x) + \text{count}(y)};$$

where x and y are the colors in the color pair, and count ( ) denotes the number of occurrences of each color in the digital color image.

9. A method according to claim 6, further comprising:
   determining visual distinctness based on an output of a function $f$ of visual area, in accordance with the equation:

$$f(x) = \frac{c}{x + c(y_2 - y_1)^{-1}} + y_1;$$

where x is a visual area occupied by one of the colors in the color pair, $y_1$ denotes a horizontal asymptote, $Y_2$ denotes a y-intercept, and c represents a fitted curve constant.

10. A method according to claim 9, further comprising:
    determining visual distinction Δ, in accordance with the equation:

$$\Delta(x, y) = \begin{cases} \text{TRUE}, & \text{if } |x - y| \geq f(v(x)); \\ \text{FALSE}, & \text{if } |x - y| < f(v(x)); \end{cases}$$

where v is a visual area comprising a largest four-way block of contiguous pixels of one of the colors in the color pair.

11. A computer-readable storage medium, holding code for performing the method according to claim 6, 7, 8, 9, or 10.

12. A system for reducing a color palette of a digital image to a natural color depth, comprising:
 a distance module selecting a neighboring color closest in color distance in a color space for each unique color in the color palette of a digital image; and
 a merge module merging the unique color and the closest neighboring color, comprising determining visual distinctness of the unique color based on the visual area occupied by the unique color in the digital image, and combining the unique color and the closest neighboring color when visually indistinct and reducing the color palette by replacing all occurrences of the unique color and the closest neighboring color with the combined color.

13. A system according to claim 12, wherein selecting the closest neighboring color and merging the unique color and the closest neighboring color is repeated until no further colors in the color palette merge.

14. A system according to claim 12, further comprising:
 a statistical module counting occurrences of the unique color, counting occurrences of the closest neighboring color, and calculating a weighted average of the unique color and the closest neighboring color to combine the unique color and the closest neighboring color.

15. A system according to claim 12, further comprising:
 a visual distinctness module evaluating the visual area occupied by the unique color relative to color distances in the color space from other colors to determine a threshold below which the unique color and any other such color are visually indistinct.

16. A system according to claim 15, wherein visual distinctness is set as occurring when the color distance between the unique color and the closest neighboring color exceeds the threshold.

17. A system according to claim 15, wherein the color distance is determined as a Euclidean distance in the color space.

18. A system according to claim 12, wherein the digital image is received as an output from another color reduction process.

19. A system according to claim 12, wherein the digital image is forwarded as an input to another color reduction process.

20. A system according to claim 12, further comprising:
 a non-natural color depth color reduction process performing a color reduction of the color palette of the digital image prior reducing the color palette to a natural color depth.

21. A system according to claim 12, further comprising:
 a compression module compressing the digital image following reduction of the color palette to a natural color depth.

22. A system according to claim 12, wherein the color space is selected from the group comprising CIELAB, RGB, sRGB, YUV, HSV, HSB, and YCbCr.

23. A method for reducing a color palette of a digital image to a natural color depth, comprising:
 selecting a neighboring color closest in color distance in a color space for each unique color in the color palette of a digital image; and
 merging the unique color and the closest neighboring color, comprising:
  determining visual distinctness of the unique color based on the visual area occupied by the unique color in the digital image; and
  combining the unique color and the closest neighboring color when visually indistinct and reducing the color palette by replacing all occurrences of the unique color and the closest neighboring color with the combined color.

24. A method according to claim 23, further comprising:
 repeatedly selecting the closest neighboring color and merging the unique color and the closest neighboring color until no further colors in the color palette merge.

25. A method according to claim 23, further comprising:
 counting occurrences of the unique color;
 counting occurrences of the closest neighboring color; and
 calculating a weighted average of the unique color and the closest neighboring color to combine the unique color and the closest neighboring color.

26. A method according to claim 23, further comprising:
 evaluating the visual area occupied by the unique color relative to color distances in the color space from other colors to determine a threshold below which the unique color and any other such color are visually indistinct.

27. A method according to claim 26, further comprising:
 setting visual distinctness as occurring when the color distance between the unique color and the closest neighboring color exceeds the threshold.

28. A method according to claim 26, further comprising:
 determining the color distance as a Euclidean distance in the color space.

29. A method according to claim 23, further comprising:
 receiving the digital image as an output from another color reduction process.

30. A method according to claim 23, further comprising:
 forwarding the digital image as an input to another color reduction process.

31. A method according to claim 23, further comprising:
 performing a color reduction of the color palette of the digital image prior reducing the color palette to a natural color depth.

32. A method according to claim 23, further comprising:
 compressing the digital image following reduction of the color palette to a natural color depth.

33. A method according to claim 23, wherein the color space is selected from the group comprising CIELAB, RGB, sRGB, YUV, HSV, HSB, and YCbCr.

34. A computer-readable storage medium holding code for performing the method according to claim 23, 24, 25, 26, 27, 28, 29, 30, 31, 32, or 33.

* * * * *